(12) United States Patent
Lior

(10) Patent No.: US 11,815,021 B2
(45) Date of Patent: Nov. 14, 2023

(54) BOOSTING CCHP GAS TURBINE SYSTEM

(71) Applicant: Turbogen Ltd., Petach Tikva (IL)

(72) Inventor: David Lior, Herzliya (IL)

(73) Assignee: Turbogen Ltd., Petach Tikva (IL)

( * ) Notice: Subject to any disclaimer, the term of this patent is extended or adjusted under 35 U.S.C. 154(b) by 11 days.

(21) Appl. No.: 17/797,464

(22) PCT Filed: Feb. 2, 2021

(86) PCT No.: PCT/IB2021/050830
§ 371 (c)(1),
(2) Date: Aug. 4, 2022

(87) PCT Pub. No.: WO2021/156743
PCT Pub. Date: Aug. 12, 2021

(65) Prior Publication Data
US 2022/0412261 A1    Dec. 29, 2022

Related U.S. Application Data

(60) Provisional application No. 62/970,222, filed on Feb. 5, 2020.

(51) Int. Cl.
*F02C 6/18*      (2006.01)
*F02C 7/18*      (2006.01)
*F02C 7/22*      (2006.01)

(52) U.S. Cl.
CPC ............... *F02C 7/18* (2013.01); *F02C 6/18* (2013.01); *F02C 7/22* (2013.01); *F05D 2260/213* (2013.01); *F05D 2260/232* (2013.01)

(58) Field of Classification Search
CPC .... F02C 9/18; F02C 7/236; F02C 7/22; F02C 7/18; F02C 7/185; F02C 6/08; F02C 6/18
See application file for complete search history.

(56) References Cited

U.S. PATENT DOCUMENTS 3,056,259 A * 10/1962 Jubb .................. F02C 7/236
  417/252
10,267,235 B2 * 4/2019 Barea-Egana .......... F02C 7/232
2018/0080383 A1 * 3/2018 Snape .................. F02C 6/08

* cited by examiner

*Primary Examiner* — Thuyhang N Nguyen
(74) *Attorney, Agent, or Firm* — Mark M. Friedman

(57) ABSTRACT

A compact cooling and boosting gas turbine system provides combined cooling, heating, and electrical power with high energy efficiency. The system has a pressure booster and a turbo-compressor. The pressure booster includes a fuel inlet, a fuel outlet, and a piston, and is in fluid communication with a gas turbine engine. The pressure booster also includes a coolant inlet, a coolant chamber, and a coolant outlet, and is in fluid communication with a closed pressurized coolant flow. The turbo-compressor includes a compressor and a turbine, and is in fluid communication with a water input flow and with the closed pressurized coolant flow. A coolant flow control valve controls the closed pressurized coolant flow. The system is configured to provide a cold water flow for a first position of the flow control valve and to provide a hot water flow for a second position of the flow control valve.

16 Claims, 2 Drawing Sheets

BOOSTING CCHP GAS TURBINE SYSTEM

CROSS-REFERENCE TO RELATED APPLICATIONS

This application claims the benefit of U.S. provisional patent application Ser. No. 62/970,222, filed Feb. 5, 2020, by the present inventor, which is incorporated by reference in its entirety herein.

FIELD OF THE INVENTION

The invention relates to a boosting gas turbine system for providing combined cooling, heating, and power (CCHP), and specifically to a boosting CCHP gas turbine system which is compact, energy efficient, and suitable for use with micro-turbines.

BACKGROUND

CCHP gas turbines provide energy that can be used for cooling, heating, and electrical power. Typically cooling is generated by absorption technology, heating by the flow of hot turbine exhaust gas, and electrical power by rotating the shaft of an electric alternator.

Cooling by absorption technology requires the use of large volume components, such as air cooling towers, and is typically unsuitable for use with compact CCHP turbines, such as micro-turbines.

In micro-turbines fueled by natural gas (NG), such as those used in urban areas, the NG supply is at a low pressure, e.g. 1.03 bar. In such cases, a fuel compressor is needed to boost the fuel pressure into the turbine compressor to approximately 10 bar. A typical fuel compressor consumes about 2% of the electrical energy output of the micro-turbine. The weight and cost of the overall system are increased because of the wasted electrical energy and added weight of the fuel compressor.

U.S. Pat. No. 9,470,114 to Wang, dated Oct. 18, 2016, and entitled "Integrated Cooling, Heating, and Power Systems", provides a single-effect absorption chiller, including an absorber operatively connected to a solution heat exchanger and a generator, and a condenser in fluid communication with the absorber, wherein the absorber is sized and configured to receive a feed of water from a source of water and to transfer heat to the feed of water and then to convey the feed of water to the condenser without further heat conditioning of the feed of water prior to its entry into the condenser, and wherein the condenser is sized and configured to receive the feed of water from the absorber and to transfer heat to the feed of water, thereby cooling the condenser without resorting to an external heat exchanger.

U.S. Pat. No. 10,830,105 to Gupta et al., dated Nov. 10, 2020, and entitled "System and Method for Improving Output and Heat Rate for a Liquid Natural Gas Combined Cycle Power Plant", discloses a combined cycle power plant and heating and cooling system and method for the power plant having a liquid natural gas supply and a vaporizer configured to vaporize the liquid natural gas into natural gas that is supplied to a gas performance heater before entering a combustion section of a gas turbine. A closed cooling water circuit is in fluid communication with at least one power plant component such as a gas turbine inlet heating/cooling coil, a heat recovery heat exchanger, the vaporizer, and mixtures thereof. An open cooling water circuit is in fluid communication with at least one power plant component such as at least one steam turbine condenser, the heat recovery heat exchanger, and mixtures thereof.

These contemporary CCHP systems exhibit several drawbacks. Absorption chillers typically have a low coefficient of performance (COP) and are too massive for use in a compact CCHP system. Furthermore, Liquefied Natural Gas (LNG) is a relatively expensive fuel, and is not readily available in many geographical locations.

SUMMARY OF THE INVENTION

The present invention is directed to embodiments of a boosting CCHP gas turbine system, which incorporates a pressure booster and has low weight and high energy efficiency.

According to other embodiments of the presently disclosed subject matter, the boosting CCHP gas system has a pressure booster and a turbo-compressor. The pressure booster includes a fuel inlet, a fuel outlet, and a piston, and is in fluid communication with a gas turbine engine. The pressure booster also includes a coolant inlet, a coolant chamber, and a coolant outlet, and is in fluid communication with a closed pressurized coolant flow. The turbo-compressor includes a compressor and a turbine, and is in fluid communication with a water input flow and with the closed pressurized coolant flow. A coolant flow control valve controls the closed pressurized coolant flow. The system is configured to provide a cold water flow for a first position of the coolant flow control valve and to provide a hot water flow for a second position of the coolant flow control valve.

According to some aspects, the gas turbine engine is a micro-turbine engine.

According to some aspects, the pressure booster is powered by a thermal exhaust power provided by the gas turbine engine.

According to some aspects, the system includes an exhaust valve.

According to some aspects, the pressure booster is powered by a portion of a compressor flow in the turbo-compressor.

According to some aspects, the pressure booster further includes a pressurized fuel tank.

According to some aspects, the turbo-compressor further includes a mechanical drive or an electric motor.

According to some aspects, the electric motor is powered by electrical power provided by the turbine engine.

According to some aspects, the gas turbine engine is fueled by natural gas.

According to some aspects, the closed pressurized coolant flow includes carbon dioxide gas.

According to some aspects, the system operates at temperatures as low as −50 degrees Celsius, without icing.

According to some aspects, the system of claim 1 further includes a water tank.

According to some aspects, the system includes a recuperator heat exchanger.

According to some aspects, the pressure booster is powered by an exhaust gas flow of the recuperator heat exchanger.

According to some aspects, the system further includes a compact water cooler.

According to some aspects, an energy efficiency of the system, when configured to provide a cold water flow, is characterized by a coefficient of performance whose value exceeds 1.80.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings.

DESCRIPTION OF THE PREFERRED EMBODIMENTS

Figure 1:
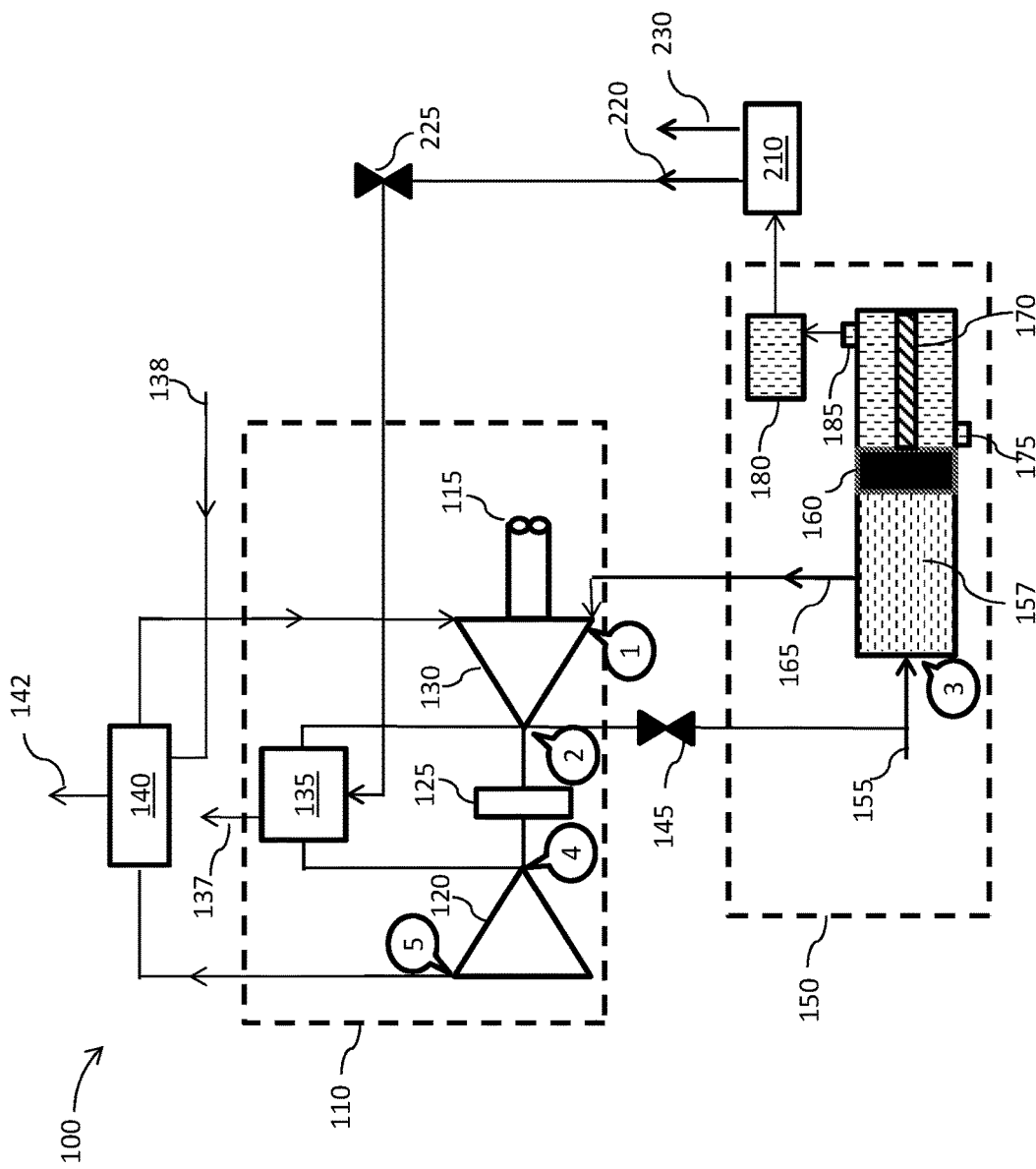
FIG. 1: An exemplary cycle flow diagram for a boosting CCHP gas turbine system, configured to provide hot water, according to an embodiment of the invention.

FIG. 1 shows an exemplary cycle flow diagram for a cooling and boosting CCHP gas turbine system 100, configured to provide a hot water output flow 142, according to an embodiment of the invention. System 100 includes a rotating turbo-compressor 110 which includes a turbine 120 connected by a shaft to a compressor 130. The turbo-compressor 110 is driven either by a mechanical drive 115 or by an electric motor 125. In some embodiments, a portion of the electrical power 230 which is provided by the gas turbine engine 210 may be used to energize the electric motor 125.

Pressure booster 150 pressurizes a fuel, such as natural gas (NG), for use by the gas turbine engine 210. The fuel pressure is typically less than 1.2 bar in an external low-pressure fuel supply (not shown) which is connected to fuel inlet 175; whereas the fuel pressure is greater than, for example, 10 bar in fuel outlet 185. The increase in pressure is provided by a reciprocating piston 160 and spring 170, driven by a pressurized coolant, such as carbon dioxide ($CO_2$) gas. Pressurized fuel tank 180 feeds fuel to a combustor (not shown) of the gas turbine engine 210. For embodiments in which the engine 210 is a micro-turbine engine, the fuel mass flow rate into the combustor is typically less than or equal to 20 grams/sec.

A coolant, such as $CO_2$ gas, which is provided by an external coolant source (not shown), flows through coolant inlet 155 into coolant chamber 157 and exits the chamber through coolant outlet 165. A closed pressurized coolant flow passes from the coolant outlet 165 through flow control valve 145 and into the compressor 130.

In FIG. 1, the system 100 is configured to heat the water input flow 138. The flow control valve 145 is in a closed position, and the exhaust valve 225 is in an open position. This enables a recuperator heat exchanger (HX) 135 to use a portion of the thermal exhaust power 220 provided by the gas turbine engine 210 to raise the inlet gas temperature to the turbine 120. A portion of the resulting increase in turbine expansion energy is used by the flow in compressor 130 to drive the pressure booster 150.

The recuperator exhaust gas 137 may be used, in some embodiments, to drive the turbo-compressor 110, thereby saving the energy that would otherwise be expended by mechanical drive 115 or electric motor 125. Alternatively, the recuperator exhaust gas may be used to provide another source of output power.

In an exemplary implementation, the values for the pressure ratio, temperature T in degrees Kelvin (° K), and temperature increments $\Delta T$ in ° K at the five stations indicated in FIG. 1 by the encircled numbers 1 through 5, are shown in TABLE 1 below.

TABLE 1

| Station # | Location | Pressure Ratio | Temperature, T(° K) | $\Delta T$ (° K) |
|---|---|---|---|---|
| 1 | Compressor inlet | 4 | 300 | 0 |
| 2 | Compressor outlet | 6.96 | 349 | 49 |
| 3 | Coolant inlet | 6.92 | 349 | 0 |
| 4 | Turbine inlet | 6.80 | 500 | 51 |
| 5 | Turbine outlet | 4.08 | 440 | 60 |

For a $CO_2$ flow rate of 1 kg/sec and a pressure booster power of up to 1 kW, the fuel outlet pressure is 10 bar, and the gas turbine engine 210 may be configured to generate a thermal exhaust power 220 equal to 140 kilowatts (kW) and an electric power 230 equal to 250 kW.

Figure 2:
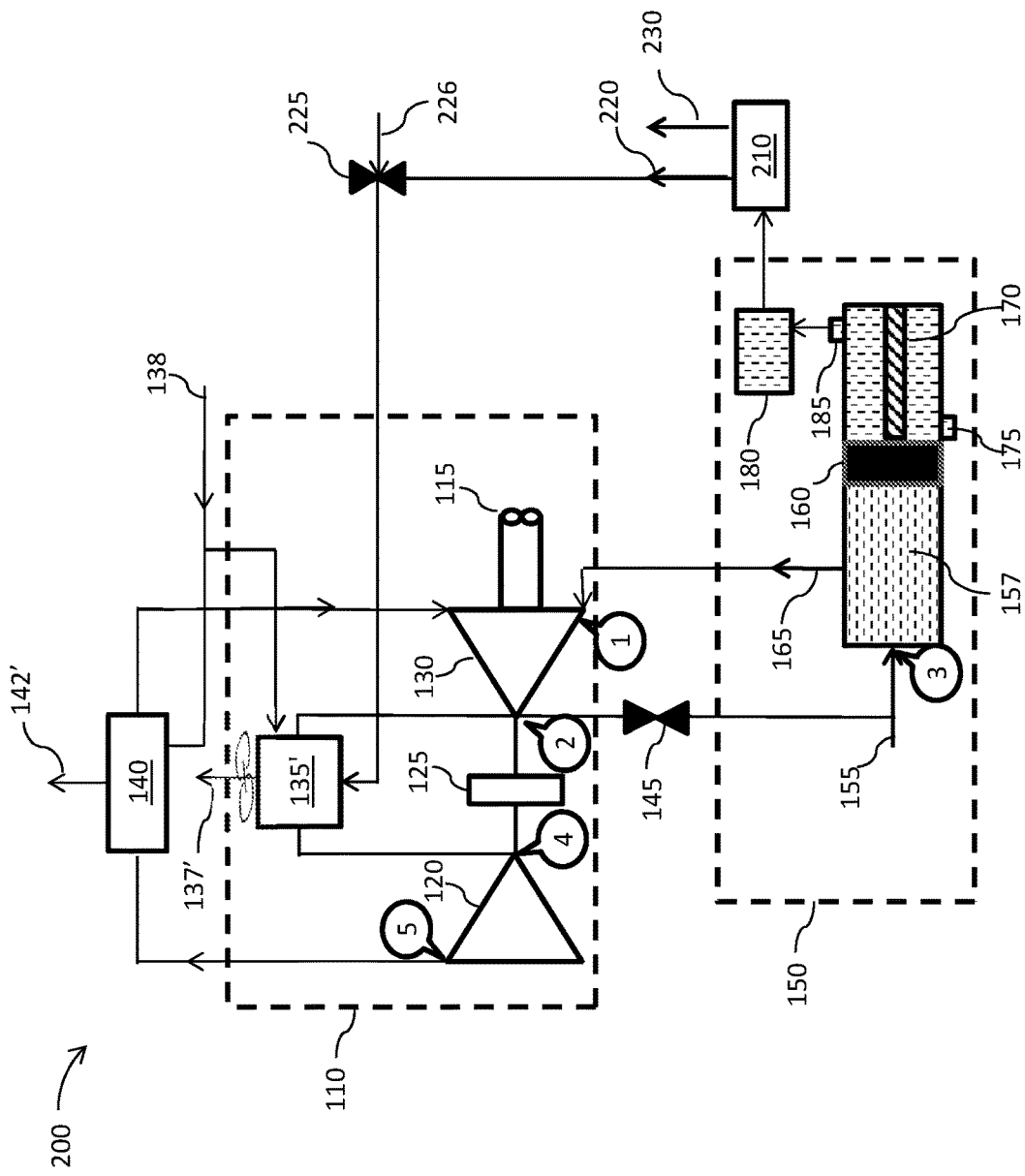
FIG. 2: An exemplary cycle flow diagram for a boosting CCHP gas turbine system, configured to provide cold water, according to an embodiment of the invention.

FIG. 2 shows an exemplary cycle flow diagram for a cooling and boosting CCHP gas turbine system 200, configured to provide a cold water output flow 142', according to an embodiment of the invention.

When the system is configured for cooling, the flow control valve 145 is in an open position, and the exhaust valve 225 is in a closed position. This enables an ambient air flow 226 to reach a compact water cooler 135', and also enables the thermal exhaust power 220 of the gas turbine engine to be redirected to external users requiring heat. Air is cooled at the outlet of compressor 130 by the cooler 135' and/or an air fan, as shown in FIG. 2. In an exemplary implementation, the resulting temperature at the inlet of turbine 120, located at station number 4, is approximately 300° K. The temperature at the outlet of turbine 120, located at station number 5, is approximately 268° K, and water flows into the water tank 140, thereby warming the fan air flow 137' and cooling the water inside the cooler 135'. The fan air flow 137' reaches a temperature of about 300° K at the cooler exit, and is then redirected to the compressor inlet, located at station number 1.

In FIG. 2, the closed pressurized coolant flow is statically pressurized to, for example, 4 bars. When circulated, the coolant pressure is increased to 7 bars, which is sufficient to activate the piston 160 of the pressure booster 150. The circulation of the coolant flow is powered either by the electric motor 125, by the turbine 120, or by the mechanical drive 115.

In an exemplary implementation, the values for the pressure ratio, temperature, and temperature increments at the stations in FIG. 2 are shown in TABLE 2 below.

TABLE 2

| Station # | Location | Pressure Ratio | Temperature (° K) | $\Delta T$ (° K) |
|---|---|---|---|---|
| 1 | Compressor inlet | 4 | 300 | 0 |
| 2 | Compressor outlet | 6.96 | 349 | 49 |
| 3 | — | — | — | — |
| 4 | Turbine inlet | 6.80 | 300 | −49 |
| 5 | Turbine outlet | 4.08 | 268 | −32 |

For a $CO_2$ mass flow rate (M) equal to 1.0 kg/sec and a $CO_2$ specific heat (Cp) equal to 0.85 Joule/(kg-° C.), $$\text{Booster Power} = [\Delta T(\text{compressor}) - \Delta T(\text{turbine})] * Cp * M = (49-32) * 0.85 * 1.0 = 14.5 \text{ kW}$$

$$\text{Cooling Capacity}(Q\text{cool}) = (300° \text{ C.} - 268° \text{ C.}) * (1.0) * (0.85) = 27.2 \text{ kW}$$

The corresponding coefficient of performance (COP) is equal to (27.2/14.5)=1.875. This is significantly higher than the COP's achieved in typical aerospace turbo-compressor cooling systems and in absorption systems, which typically have COP's of about 1.0 and 1.5, respectively.

The cooling and boosting CCHP gas turbine system of the invention provides several additional advantages over existing CCHP turbine systems. For example, the invention avoids a need to use hot pressurized bleed air from the compressor of the gas turbine engine 210, as is commonly used in prior-art aerospace cooling systems. This avoids contamination of the air with oil or fuel residuals as well as the need to cool hot exhaust gases.

Furthermore, when $CO_2$ is used as the pressurized coolant, the system of the present invention can operate at temperatures as low as −50° C., without the icing difficulties that plague existing open air systems.

In addition, the pressure booster 150 of the present invention may increase fuel pressure using energy drawn from the recuperator exhaust gas, and thus avoid the need for an external source of power.

Although the invention has been described in conjunction with specific embodiments, it is evident that many alternatives, modifications, and variations will be apparent to those skilled in the art. For example, the pressure booster may use a different material for the pressurized coolant, in place of $CO_2$ gas, and a different material for the engine fuel, in place of natural gas. Accordingly, the invention is intended to embrace all such alternatives, modifications, and variations that fall within the spirit and broad scope of this disclosure.

The invention claimed is:

1. A boosting gas turbine system for providing combined cooling, heating, and electrical power (CCHP), comprising:
   a pressure booster in fluid communication with a gas turbine engine, and comprising a fuel inlet, a fuel outlet, and a piston;
   the pressure booster further comprising a coolant inlet, a coolant chamber, and a coolant outlet, and in fluid communication with a closed pressurized coolant flow;
   a turbo-compressor comprising a compressor and a turbine, and in fluid communication with the closed pressurized coolant flow; and
   a coolant flow control valve controlling the closed pressurized coolant flow;
   wherein the system is configured to provide a cold water flow for a first position of the coolant flow control valve and to provide a hot water flow for a second position of the coolant flow control valve.

2. The system of claim 1 wherein the gas turbine engine is a micro-turbine engine.

3. The system of claim 1 wherein the pressure booster is powered by a thermal exhaust power provided by the gas turbine engine.

4. The system of claim 1 further comprising an exhaust valve.

5. The system of claim 1 wherein the pressure booster is powered by a portion of a compressor flow in the turbo-compressor.

6. The system of claim 1 wherein the pressure booster further comprises a pressurized fuel tank.

7. The system of claim 1 wherein the turbo-compressor further comprises a mechanical drive or an electric motor.

8. The system of claim 6 wherein the electric motor is powered by electrical power provided by the gas turbine engine.

9. The system of claim 1 wherein the gas turbine engine is fueled by natural gas.

10. The system of claim 1 wherein the closed pressurized coolant flow comprises carbon dioxide gas.

11. The system of claim 10 wherein the system operates at temperatures as low as −50 degrees Celsius, without icing.

12. The system of claim 1 further comprising a water tank.

13. The system of claim 1 further comprising a recuperator heat exchanger.

14. The system of claim 13 wherein the pressure booster is powered by an exhaust gas flow of the recuperator heat exchanger.

15. The system of claim 1 further comprising a compact water cooler.

16. The system of claim 1 wherein an energy efficiency of the system, when configured to provide the cold water flow, is characterized by a coefficient of performance whose value exceeds 1.80.

* * * * *